United States Patent
Kanbayashi et al.

(10) Patent No.: US 7,319,913 B2
(45) Date of Patent: Jan. 15, 2008

(54) DEVICE AND METHOD FOR EXTRACTING UNMACHINED SHAPE

(75) Inventors: Satoshi Kanbayashi, Kawasaki (JP); Shingo Yamaguchi, Kawasaki (JP); Hiroshi Takahashi, Kawasaki (JP); Mitsugu Suzuki, Atsugi (JP); Yoshiyuki Haruta, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/146,356

(22) Filed: Jun. 7, 2005

(65) Prior Publication Data

US 2005/0273194 A1    Dec. 8, 2005

Related U.S. Application Data

(63) Continuation of application No. PCT/JP03/06867, filed on May 30, 2003.

(51) Int. Cl.
   *G06F 19/00* (2006.01)
(52) U.S. Cl. ........................ 700/178; 700/184
(58) Field of Classification Search ................ 700/178, 700/159, 160, 173, 174–176, 179, 180, 182, 700/184, 186
   See application file for complete search history.

(56) References Cited

U.S. PATENT DOCUMENTS 5,827,020 A * 10/1998 Fujita et al. .................. 409/80

6,266,572 B1 * 7/2001 Yamazaki et al. ............ 700/96
6,662,073 B1 * 12/2003 Fujishima et al. .......... 700/173
6,824,336 B2 * 11/2004 Izutsu et al. ................ 409/132

FOREIGN PATENT DOCUMENTS

| JP | 6-102914  |   | 4/1994 |
|----|-----------|---|--------|
| JP | 7-129221  |   | 5/1995 |
| JP | 7-148644  |   | 6/1995 |
| JP | 10-20918  |   | 1/1998 |
| JP | 11-65631  |   | 3/1999 |
| JP | 11-065631 | * | 3/1999 |
| JP | 11-134014 |   | 5/1999 |

* cited by examiner

*Primary Examiner*—Zoila Cabrera
(74) *Attorney, Agent, or Firm*—Staas & Halsey LLP

(57) ABSTRACT

A safe and efficient machining process design is realized by extracting the unmachined shape and by three-dimensionally visualizing the unmachined shape without generating a machining track. The present device 1 comprises a displacement unit 2 for displacing a machining tool on the surface of a three-dimensional product shape model at arbitrary positions without causing interference between the product shape model and the machining tool, a detection unit 3 for detecting a distance between the arbitrary position and the machining tool, and a preparation unit 4 for preparing the three-dimensional unmachined shape by using the minimum value of the distance obtained for each point on the surface of the shape model when the arbitrary point is moved.

9 Claims, 12 Drawing Sheets

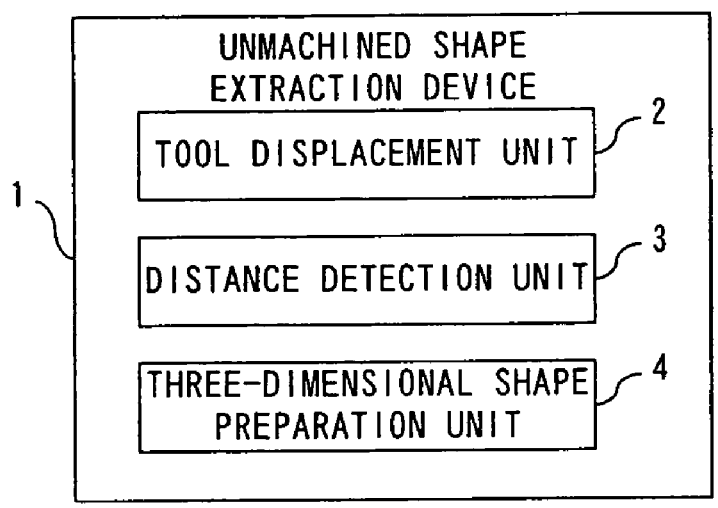
F I G. 1

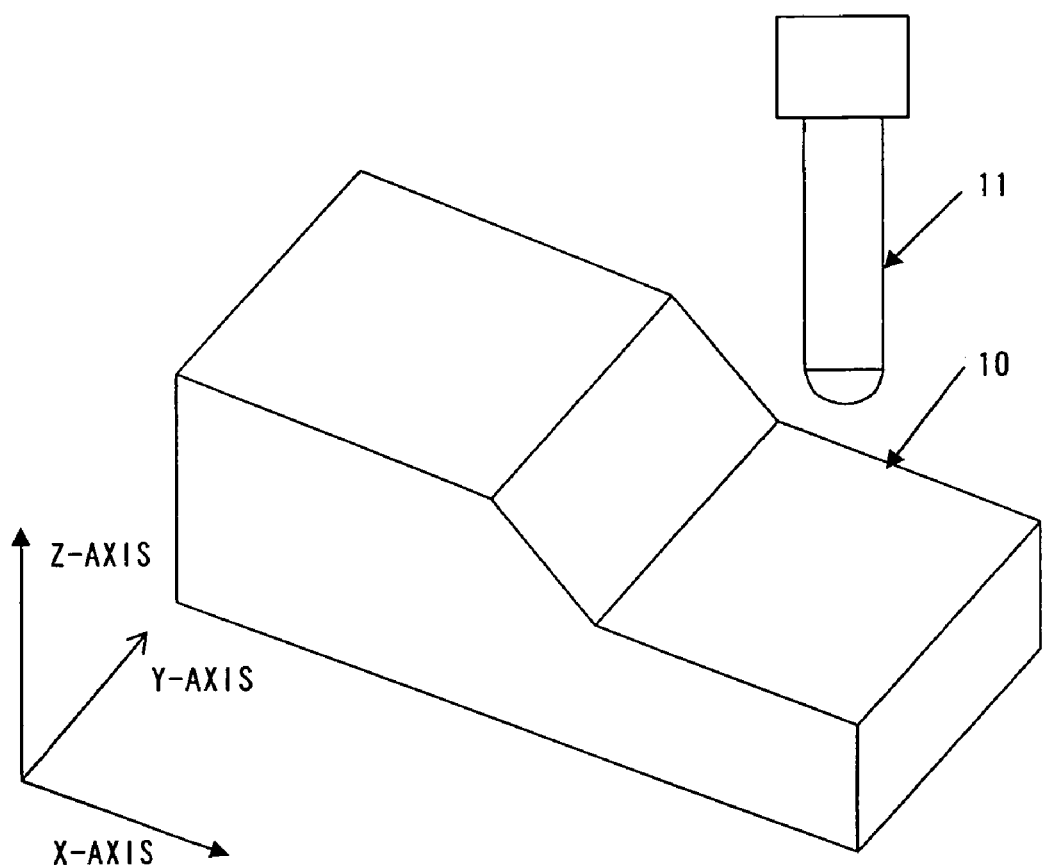
F I G. 2

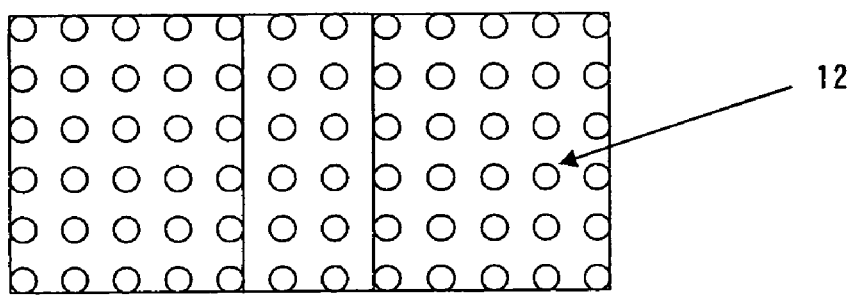
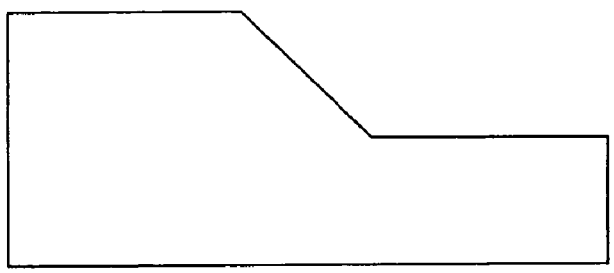
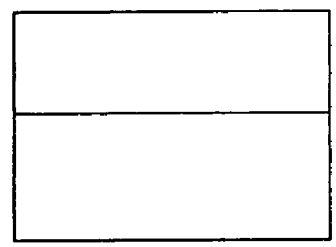
F I G. 3

DEVICE AND METHOD FOR EXTRACTING UNMACHINED SHAPE

CROSS REFERENCE TO RELATED APPLICATION

This application is a continuation application of International PCT Application No. PCT/JP2003/006867 which was filed on May 30, 2003.

BACKGROUND OF THE INVENTION

1. Field of the Invention

The present invention relates to a method of machining a product and a component of the product, and to a device and method for extracting an unmachined shape which facilitate the design of the machining process by extracting the unmachined shape on the product shape to be manufactured when machining the product e.g. when cutting the product in a system for aiding the design and production of products such as CAD/CAM systems.

2. Description of the Related Art

When components or products are manufactured by machining material, machining is generally conducted through various stages while changing machining tools, machining conditions and the like. Accordingly, it is important to precisely grasp the unmachined shape after the machining e.g. the uncut shape in the cutting, from the view point of efficiency of the machining, the securement of the safety, and the efficiency in the design of the three-dimensional machined shape.

For example, as the conventional techniques, there are documents as below, for machining the material by using CAD, CAM or CAE systems.

In Japanese Patent Application Publication No. 7-148644, "CAM system for generating tool track in machining metal", a CAM system is disclosed which determines the machined portion by each tool by extracting all of the concave portions from the mold shape model and sorting the tool tracks of the respective concave portions for each tool.

In Japanese Patent Application Publication No. 10-20918, "CAD/CAM apparatus", a technique is disclosed in which the three dimensional interference model is prepared from the product shape model and the movement track model so that the interference model is three-dimensionally displayed.

However, generally in the above conventional techniques, there is a problem that the amount of the uncut shape can not be extracted unless the unmachined positions and the unmachined amount e.g. the uncut amount are manually determined based on the machined shape i.e. the shape of the product and the shape of the tool and the tool track i.e. the machining conditions e.g. the machining track and the like, or unless the machining track is generated in order to extract the uncut shape from the difference in shape between the machining track and the three-dimensional product shape by generating the machining track corresponding to the machining tool.

Also, there is a problem that in order to precisely grasp the unmachined shape, the unmachined amount has to be extracted each time the machining track is altered so that the efficiency becomes low and the unmachined shape depends on the machining track.

SUMMARY OF THE INVENTION

In the light of the above problems, it is an object of the present invention to realize a safe and efficient design of the machining processes by extracting the unmachined shape corresponding to the machining tool and visualizing the extracted shape as the three-dimensional shape, without generating the machining track.

The unmachined shape extraction device according to the present invention comprises a tool displacement unit, a distance detection unit and a three-dimensional shape preparation unit.

The tool displacement unit virtually displaces a tip of the machining tool to an arbitrary position on the surface of the three-dimensional product shape model without causing interference between the product shape model and the machining tool. The distance detection unit obtains the minimum value of the distance between the point corresponding to the above arbitrary position and the tip of the machining tool. The three-dimensional shape preparation unit prepares the three-dimensional machined shape corresponding to the above minimum value of the distance.

In the present invention, many points are arranged as the above arbitrary positions on the surface of the three-dimensional product shape model, and the process of obtaining the minimum value of the distance between the tip of the machining tool and each of the above many points are repeated so that the three-dimensional unmachined shape is extracted corresponding to the minimum value of the distance.

In the method for extracting the unmachined shape of the present invention, a method is employed in which the tip of the machining tool is virtually displaced to an arbitrary position on the surface of the three-dimensional product shape model without causing an interference between the product shape model and the machining tool, the distance between the point corresponding to the arbitrary position and the tip of the machining tool is obtained, and the minimum value of the distance is obtained by moving the point of the arbitrary position so that the three-dimensional unmachined shape is prepared corresponding to the minimum value.

As above, according to the present invention, the unmachined shape is extracted without generating the machining track.

BRIEF DESCRIPTION OF THE DRAWINGS

FIG. 1 is a principle configuration block diagram of an unmachined shape extraction device according to the present invention;

FIG. 2 explains an example of machined shape and a machining tool for explaining an embodiment of the present invention;

FIG. 3 explains points on which the uncut amount on the surface of the machined shape is to be determined;

DESCRIPTION OF THE PREFERRED EMBODIMENTS

Figure 4:
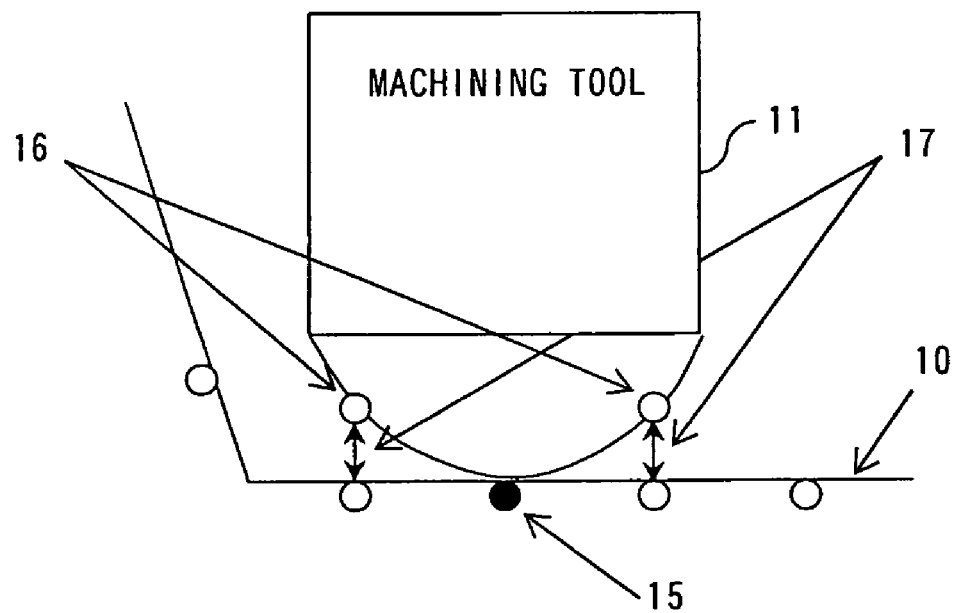
FIG. 4 explains an example of the uncut amount on the point to which the machining tool is displaced.

FIG. 1 is a principle configuration block diagram of an unmachined shape extraction device according to the present invention. In FIG. 1, the unmachined shape extraction device 1 comprises a tool displacement unit 2, a distance detection unit 3 and a three-dimensional shape preparation unit 4.

The tool displacement unit 2 virtually displaces a tip of the machining tool corresponding to an arbitrary position on the surface of a three-dimensional product shape model without causing interference between the product shape model and the machining tool. For example the tool displacement unit 2 virtually displaces the tip of the machining tool so that the tip faces the surface of the model at right angles corresponding to the arbitrary position on the surface.

The distance detection unit 3 obtains a distance between a point corresponding to the above arbitrary position and the tip of the machining tool. The three-dimensional shape preparation unit 4 prepares the three-dimensional shape of the unmachined portion corresponding to the minimum value of the distance obtained by moving the position of the arbitrary position i.e. the minimal value of the distance between each of the points on the surface and the tip of the machining tool.

The unmachined shape extraction device 1 can comprise a three-dimensional shape visualization unit for visualizing the three-dimensional unmachined shape prepared by the three-dimensional shape preparation unit 4.

Next, in a method for extracting the unmachined shape according to the present invention, a method can be employed in which the tip of the machining tool is virtually displaced corresponding to an arbitrary position on the surface of the three-dimensional product shape model without causing an interference between the product shape model and the machining tool, the distance between the point corresponding to the arbitrary position and the tip of the machining tool is obtained, and the three-dimensional machined shape is prepared corresponding to the minimum value of the distance between each of the points on the surface and the tip of the machining tool obtained by moving the arbitrary position on the surface. Further, a method of visualizing the prepared three-dimensional unmachined shape can be employed.

Also, in a program and a computer readable transportable storage medium according to the present invention, a program and a storage medium for realizing the method can be employed.

Next, by referring to FIG. 2 and subsequent figures, embodiments of the present invention will be explained in more detail. FIG. 2 explains an example of the machined shape i.e. the three-dimensional product shape model and the machining tool for explaining the present embodiment. In FIG. 2, a machined shape 10 has a shape which includes a height gap in a direction of Z-axis. And by cutting the machined shape 10 by using a machining tool 11, a product of the machined shape 10 is manufactured. It is to be noted that the method of machining to which the present invention is applied is not limited to the cutting so that any method of machining can be employed as long as the unmachined shape can be extracted.

FIG. 3 shows three-views for the machined shape 10 of FIG. 2 for explaining arbitrary points each on which the uncut amount in the cutting is to be determined. In FIG. 3, it is shown that arbitrary points 12 each on which the uncut amount is to be determined are arranged lattice-like on an upper face of the machined shape.

FIG. 4 explains a displacement example of the machining tool for the machined shape. In FIG. 4, a situation is shown in which the machining tool 11 is displaced above the arranged point 15 for the tip of the machining tool on the surface of the machined shape 10. In this example, the machining tool 11 is displaced at right angles to the surface of the machined shape 10. When the density of the arbitrary points each on which the unmachined amount is to be determined as shown in FIG. 3 is high, a plurality of the arbitrary points are under the machining tool 11 so that, around the displaced point 15 for the tip of the tool, there are one or more points 16 to be projected by the plurality of the arbitrary points on the surface of the tool besides the displaced point 15. The distance between each of the one or more projected points and each of the corresponding arbitrary points on the machined shape 10 is obtained as an uncut amount 17.

Figure 5:
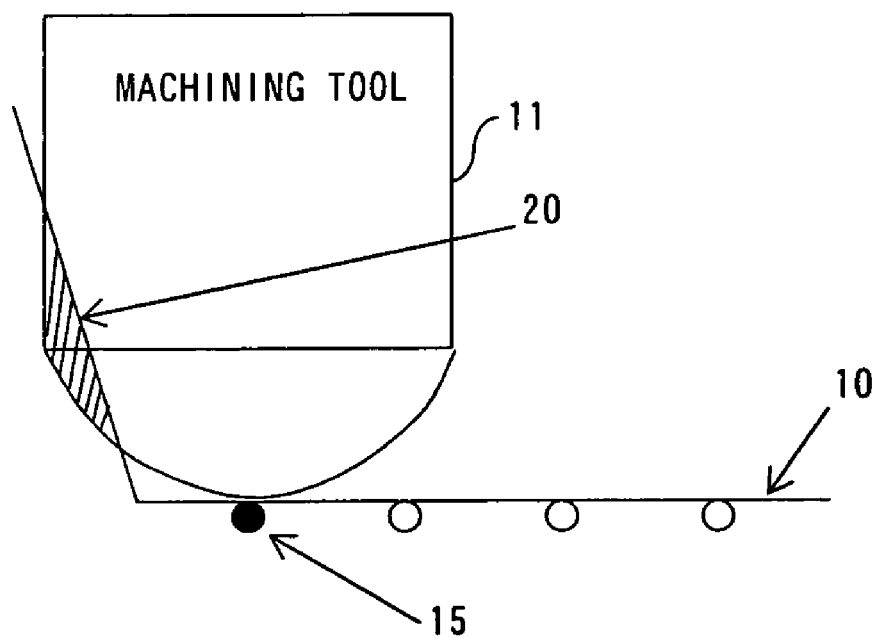
FIG. 5 explains the interference between the machined shape and the machining tool.

FIG. 5 shows a situation in which the machining tool 11 is displaced with respect to the machined shape 10 similarly as in FIG. 4. In the figure, it is shown that the distance between the machining tool 11 and the machined shape 10 can not be zero actually on the point 15 to which the machining tool is displaced due to interference 20 between the machined shape 10 and the machining tool 11.

Figure 6:
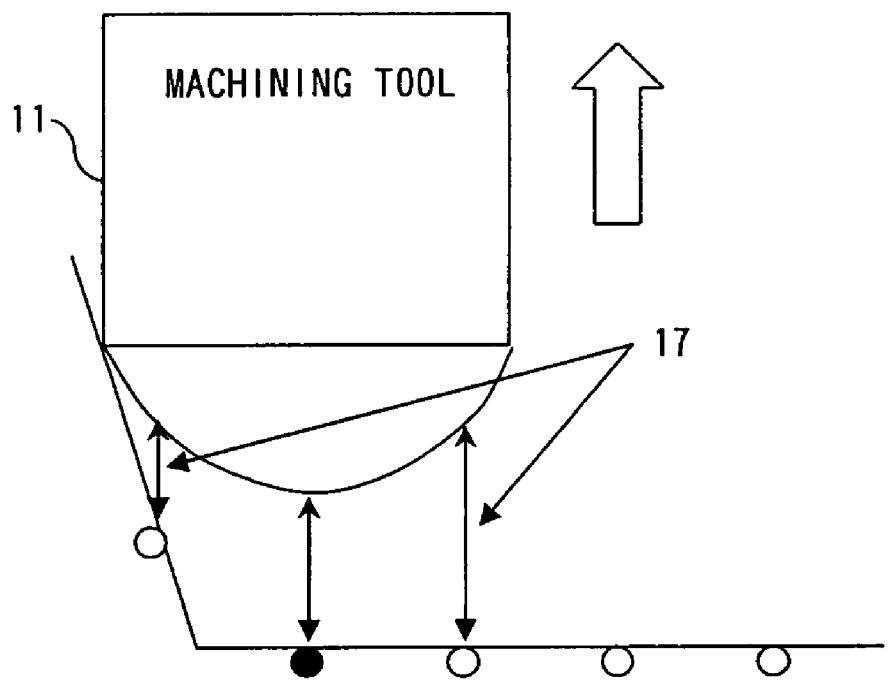
FIG. 6 shows the movement of the machining tool to the position at which the interference does not occur.

FIG. 6 shows a situation in which the machining tool 11 is moved, in the direction of Z-axis from the position in FIG. 5 to the position at which the interference does not occur between the machining tool 11 and the machined shape 10. By moving the machining tool 11 as above, the uncut amount 17 can be obtained on the point 15 to which the machining tool is displaced and one or more points around the point 15.

Figure 7:
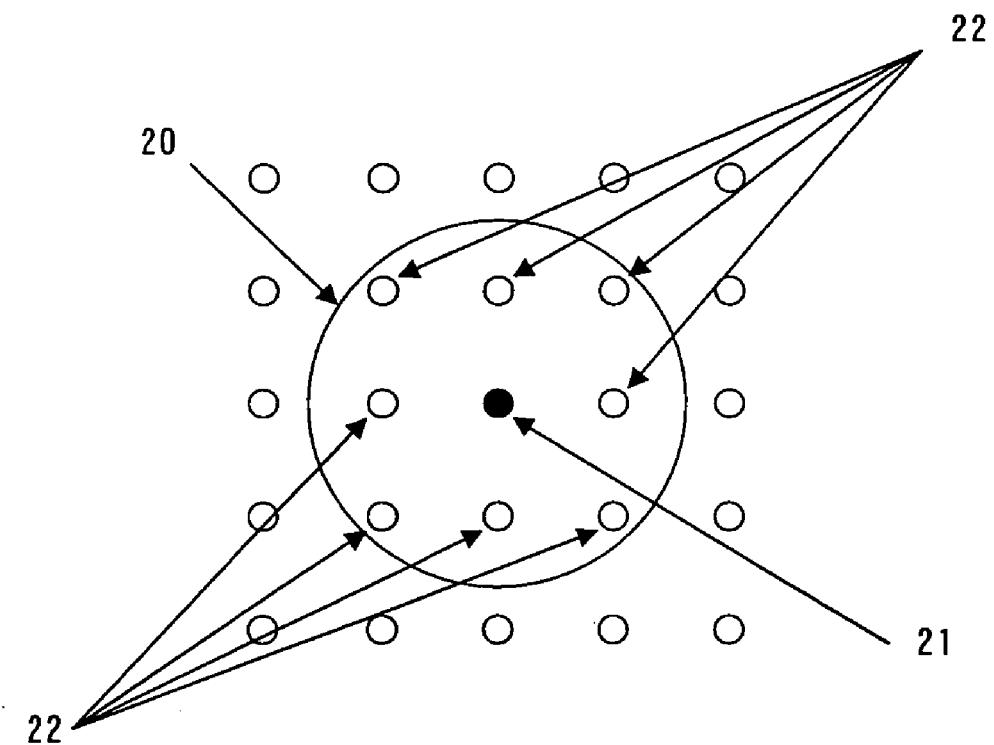
FIG. 7 explains the points on which the uncut amount is to be determined around the point to which the machining tool is displaced.

FIG. 7 explains the points each on which the uncut amount is to be determined in FIG. 4 or FIG. 6. In FIG. 7, it is shown that the nine points each on which the uncut amount is to be determined are included in a circle 20 which corresponds to the contour of the machining tool. The center point 21 corresponds to the point 15 to which the tip of the machining tool 11 is displaced in FIG. 4 or FIG. 6, and eight points 22 around the point 21 are the points around the point 21 to which the tip of the machining tool 11 is displaced, each on which the uncut amount is to be determined.

Figure 8:
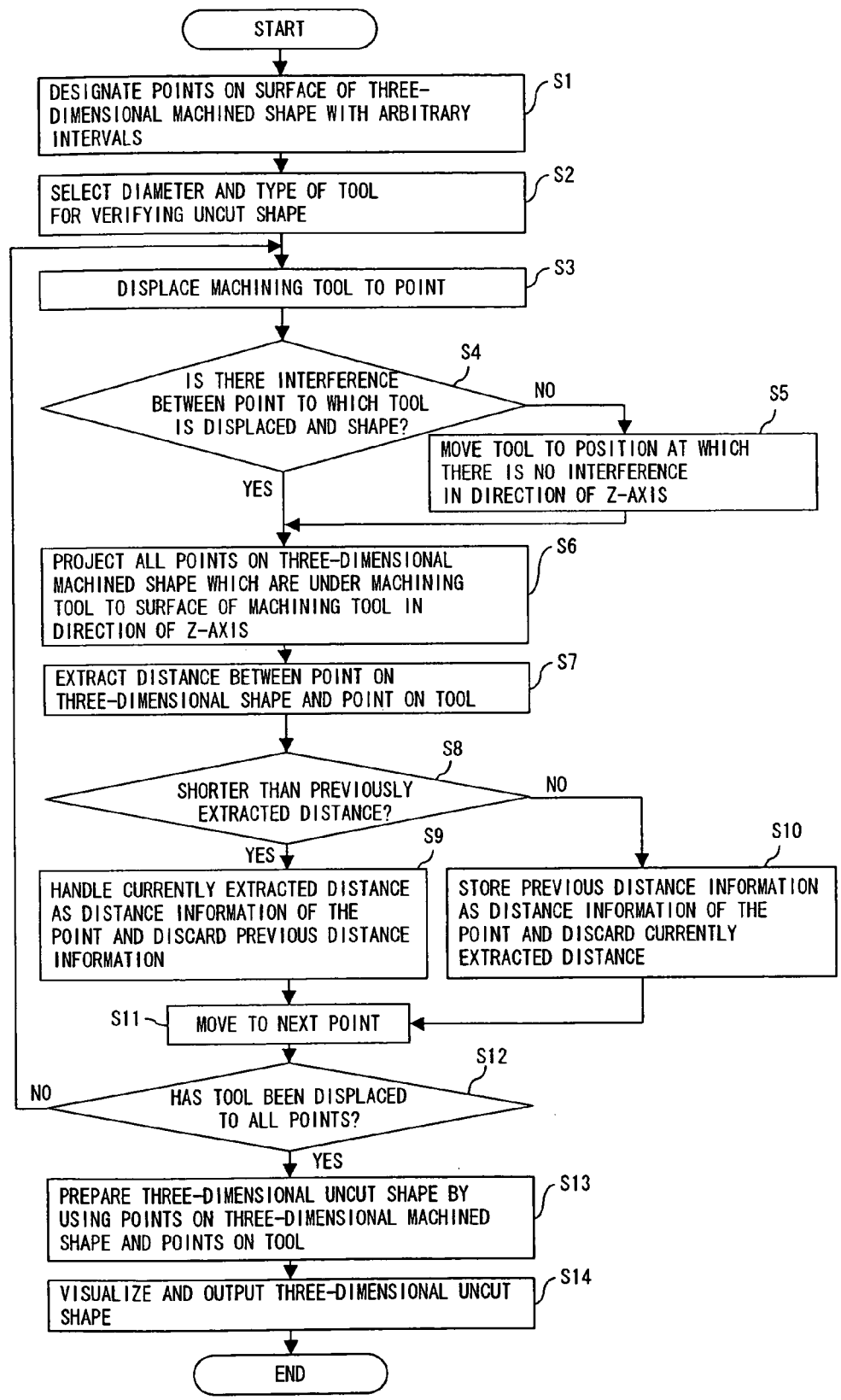
FIG. 8 is a detailed flowchart for a process of the extraction of the uncut shape.

FIG. 8 is a flowchart for a process of preparing the uncut shape in a present embodiment. In FIG. 8, when the process starts, points each on which the uncut amount is to be determined are designated with arbitrary intervals on the surface of the three-dimensional machined shape e.g. the three-dimensional product shape model in the CAD system in step S1. There is not a limitation regarding the interval, and the arrangement of the point is not necessarily lattice like. However, it is common that the interval is set so that a plurality of the points are included under the tip portion of the machining tool as shown in FIG. 4.

Next, in step S2, a diameter and a type of the tool are selected for verifying the uncut shape. Here, in order to put a stress on the explanation of the method of the extraction of the three-dimensional uncut shape, a detailed explanation of the above selection of the tool is omitted. However, for example, by selecting the tool whose diameter is the largest among the tools scheduled to be used or by selecting the tool based on the dimension of the machined shape, e.g. selecting the tool whose diameter is close to five percent of the length in the direction of the X-axis in FIG. 2, the uncut amount can be extracted in the case that rough machining was conducted. And this can be used as the information for determining the use of the tool with a smaller diameter for machining.

Subsequently, steps S3 to S12 are repeated regarding each of all the points on the surface each on which the uncut amount is to be determined as shown in FIG. 3. Initially in step S3, the machining tool is displaced to the first point as shown in FIG. 4, and it is determined whether or not there is the interference on the point between the machining tool 11 and the machined shape 10 as shown in FIG. 5 in step S4. When there is the interference, the machining tool is moved in the direction of the Z-axis to the position on which the interference does not occur between the machining tool 11 and the machined shape 10 in step S5 as shown in FIG. 6. After this step S5 or when there is not the interference, the step S6 is immediately executed.

In step S6, all of the points on the three-dimensional shape which are under the machining tool i.e. nine points explained in FIG. 7 are projected on the surface of the machining tool in the direction of the Z-axis, and the distance between each of the nine projected points and the corresponding point on the three-dimensional shape is extracted in step S7.

Then, in step S8, when there is a record of each of the previously extracted distances corresponding to another displaced point for the machining tool regarding each of nine pairs of the points about which the distances are extracted in step S7, a comparison is made between the distance of each of the nine pairs of the points and the previously extracted distance of each of the corresponding pairs of the points. Regarding the pair of the points whose currently extracted distance is shorter, the distance of the currently extracted pair is handled as the distance information of the pair of the points in step S9 so that step S11 is executed after discarding the previous distance information.

Contrary to the above, regarding the pair of the points whose currently extracted distance is not shorter than the previously extracted distance among distances of the nine pairs of the points, the previously extracted distance of the pair i.e. the previous distance information is stored as the distance information of the pair of the points in step S10 so that step S11 is executed after discarding the currently extracted distance.

In step S11, the point to which the machining tool is to be displaced is moved to the next point, and it is determined whether or not the machining tool has been displaced to all of the points including the current point. When the machining tool has not been displaced to all of the points, the step S3 and the subsequent steps are repeated.

When it is determined that the machining tool has been displaced to all of the points in step S12, the three-dimensional shape is prepared by using the points on the three-dimensional machined shape and the points projected on the surface of the machining tool in step S13. Thereafter, the prepared shape is visualized and output in step S14, and the process is ended. The step S13 and the step S14 will be further explained later.

By executing the step S1 to the steps S12, the minimum distance corresponding to the uncut amount in the case of using the selected machining tool, regarding each of all of the points on which the uncut amount is to be determined in FIG. 3. For example, in FIG. 4, although the uncut amount is zero on the point 15 to which the tip of the machining tool 11 is displaced, the uncut amount i.e. the distance each of the right and left points of the tip is not zero. However, when the tip of the machining tool 11 is displaced to the position precisely above the right point of the tip by being moved to the right side, the uncut amount on this right point i.e. the distance is zero. Accordingly, the minimum vale is stored regarding each point in step S8, step S9 or step S10 so that the minimum distance regarding each of the points 12 on which the uncut amount is determined as shown in FIG. 3 is extracted as the uncut amount.

Figure 9:
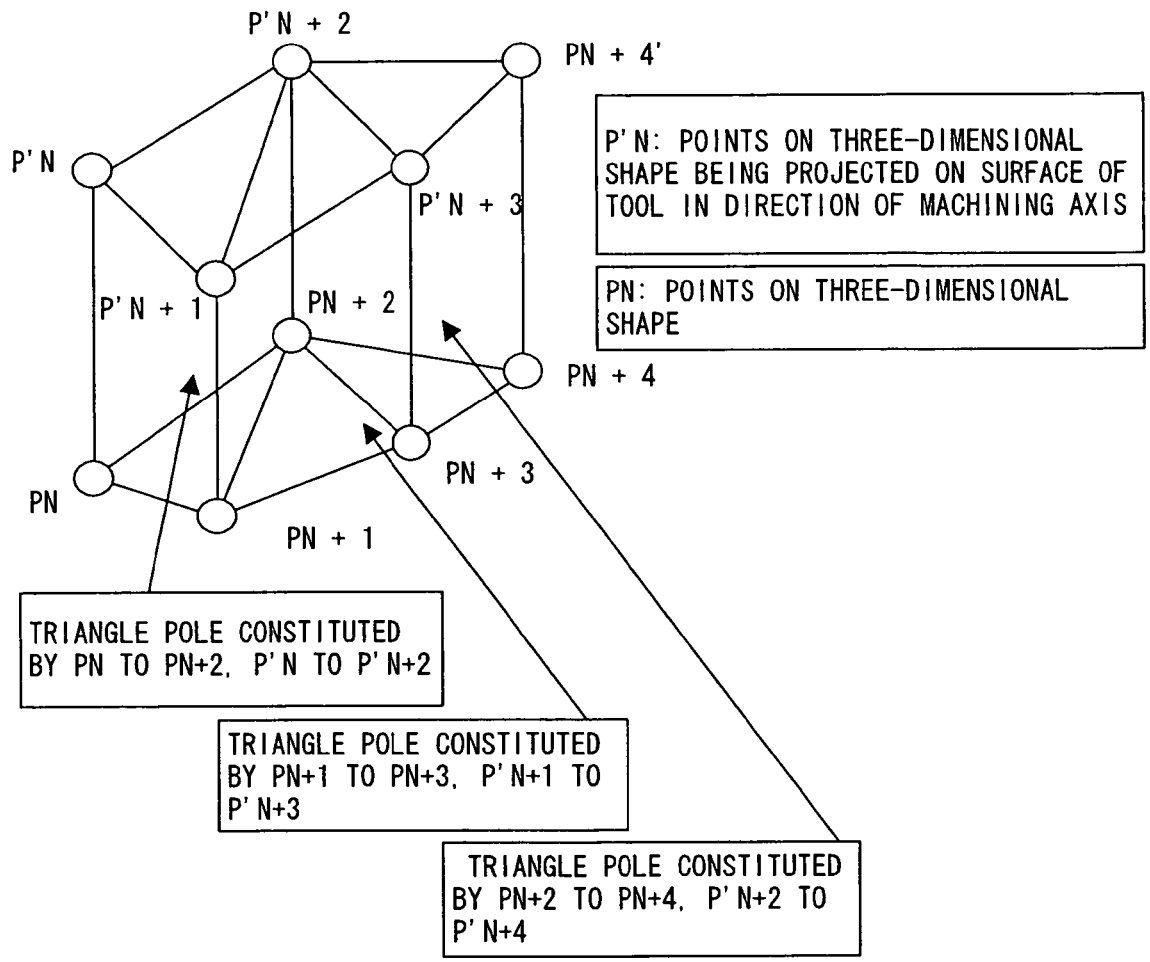
FIG. 9 explains a triangle pole to be used for the preparation of the three-dimensional shape.

FIG. 9 explains a specific example of the preparation of the three-dimensional uncut shape in the step S13 of FIG. 8. In FIG. 9, the points Pn to Pn+4 on the base are the points on the surface of the machined shape 10 in FIG. 6 for example. And the points P'n to P'n+4 are the points projected on the surface of the machining tool 11 of the points on the surface of the three-dimensional machined shape 10. The three-dimensional uncut shape is expressed as a three-dimensional figure including the above points as the vertexes.

In the present embodiment, the three-dimensional shape as above is expressed as a set of triangle poles. In this case, the three-dimensional uncut shape is expressed with three triangle poles including the left triangle pole with the vertexes Pn, Pn+1, Pn+2, P'n, P'n+1 and P'n+2.

Figure 10:
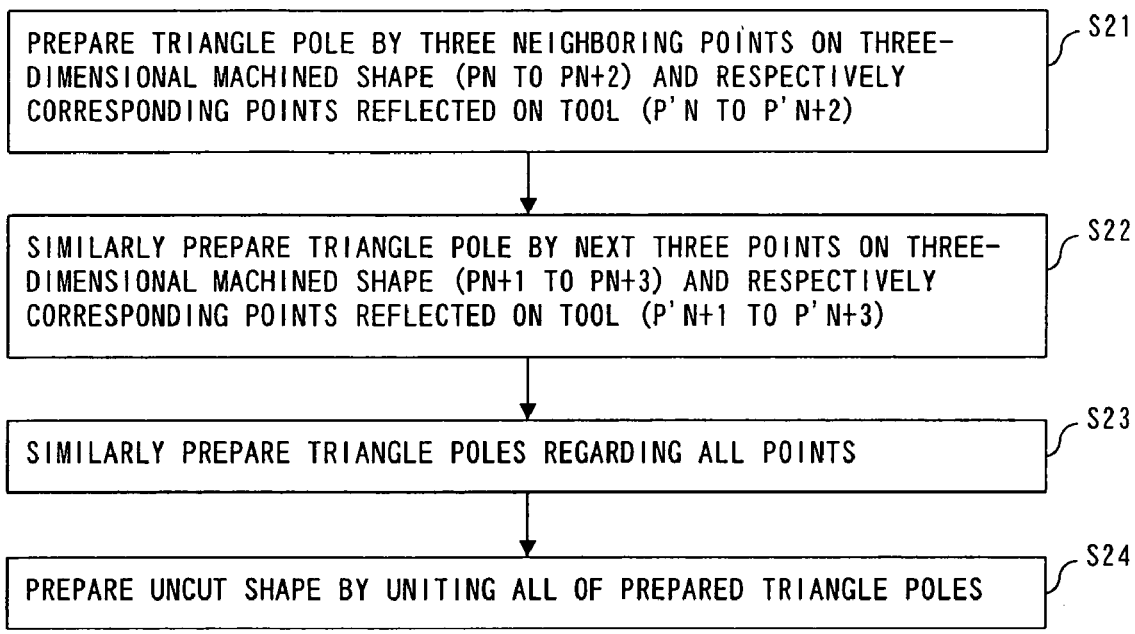
FIG. 10 is a detailed flowchart for the process of preparation of the uncut shape.

FIG. 10 is a detailed flowchart for the process of preparation of the above three-dimensional uncut shape. When the process is started in FIG. 10, initially, the left triangle pole explained in FIG. 9 is prepared in step S21. Next, the middle triangle pole is prepared in step S22. The other triangle poles, e.g. the right triangle pole in FIG. 9, are prepared in step S23. Thereafter, all of the triangle poles are united so that the three-dimensional uncut shape is prepared in step S24. Then the process is ended.

Figure 11:
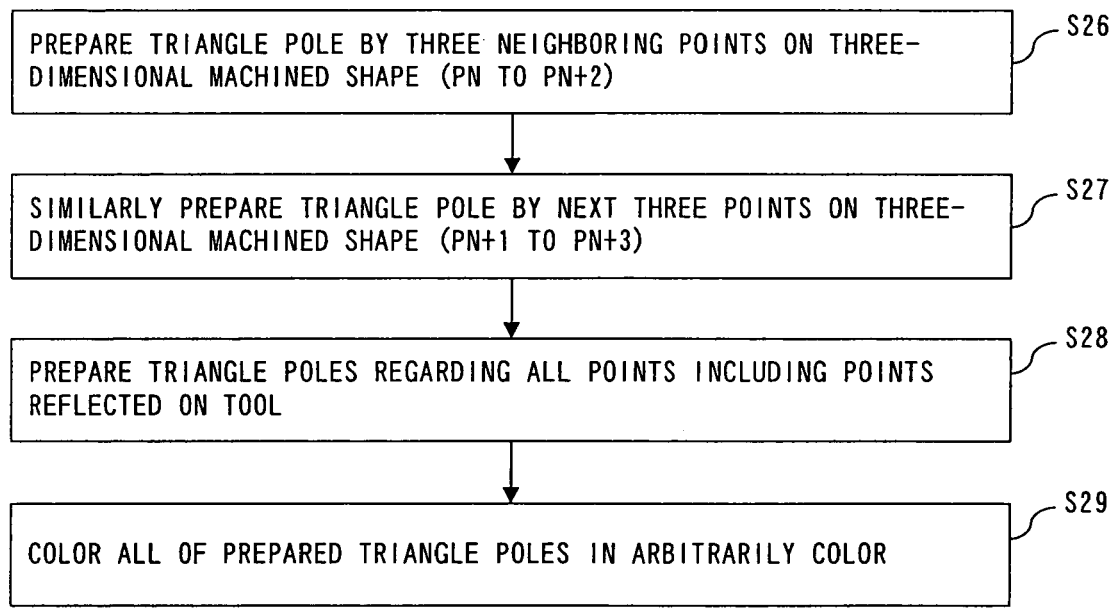
FIG. 11 is a detailed flowchart for the process of the three-dimensional shape visualization.

FIG. 11 is a detailed flowchart for the process of the three-dimensional shape visualization in step S14 of FIG. 8. In the present embodiment, the three-dimensional uncut shape is visualized by coloring all of the triangles constituting the outermost surface of the three-dimensional figure explained in FIG. 9.

When the process is started in FIG. 11, the leftmost triangle on the plane of the base of the three-dimensional figure of FIG. 9 is prepared in step S26, the middle triangle on the base is prepared in step S27, and all the other triangles on the surface of the three-dimensional figure are prepared in step S28. In step S29, all of the prepared triangles are colored in an arbitrary color and the process is ended.

Figure 12:
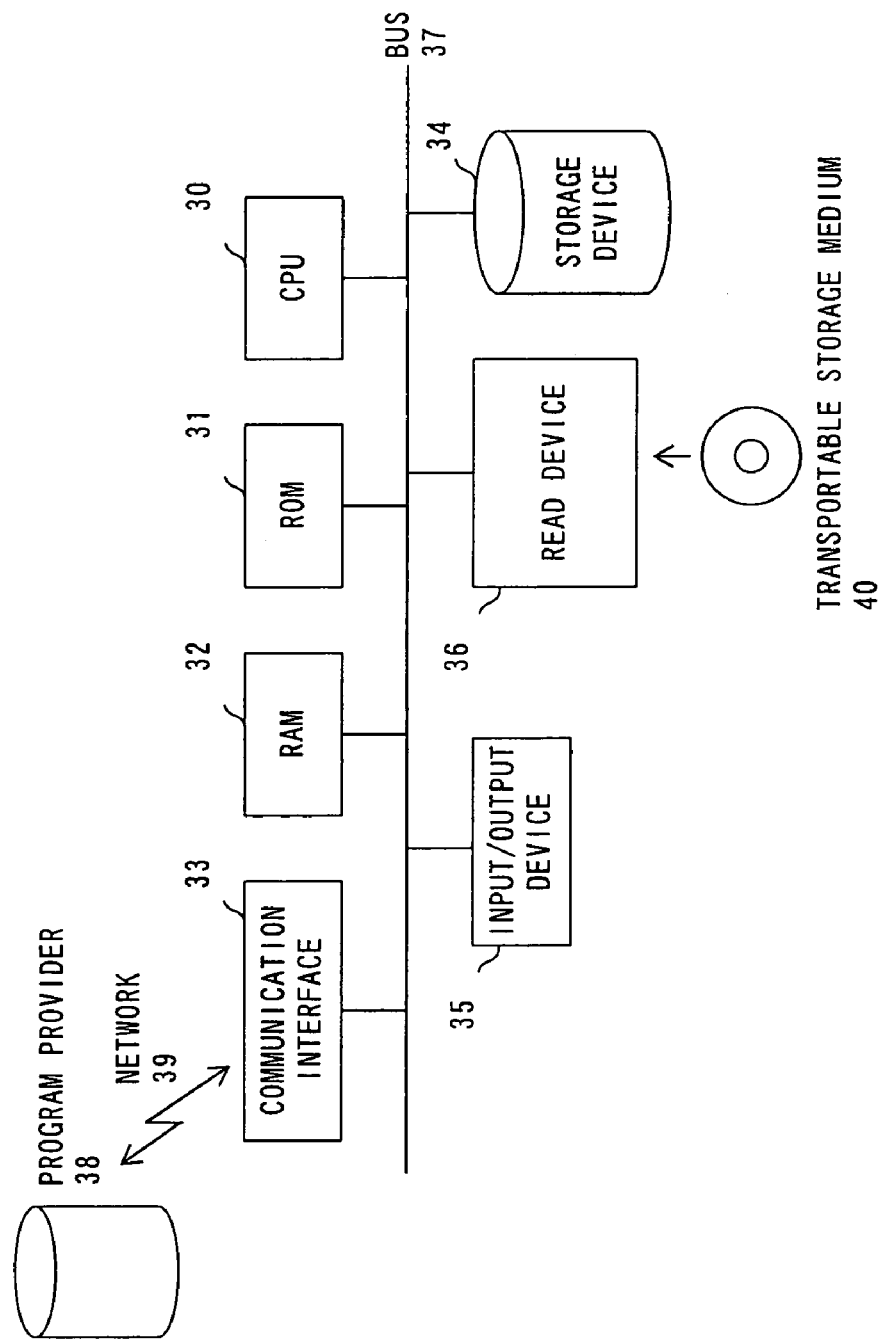
FIG. 12 explains the loading of the program to the computer in the present invention.

Hereinbefore, the unmachined shape extraction device and the extraction method therefore according to the present invention have been explained in detail. However, it is naturally understood that the device can be constituted mainly by a common computer. FIG. 12 is a configuration block diagram for such a computer system i.e. a hardware environment.

In FIG. 12, the computer system comprises a central processing unit (CPU) 30, read only memory (ROM) 31, random access memory (RAM) 32, a communication interface 33, a storage device 34, an input/output device 35, read device for a transportable storage medium 36, and a bus 37 to which all of the above components are connected.

As the storage device 34, various types of storage devices such as a hard disk, a magnetic disk and the like can be used. In such a storage device 34 or in the ROM 31, the program shown in the flowcharts of FIG. 8, FIG. 10 and FIG. 11 or the program defined in the fifth aspect of the present invention are stored, and the extraction of the unmachined shape and the visualization of the shape in the present embodiment are realized with these programs executed by the CPU 30.

These programs can be stored for example in the storage device 34 via a network 39 and the communication interface 33 from the side of a program provider 38 to be executed by the CPU 30. Also, these programs can be stored in the transportable storage medium 40 which is commercially available and set in the read device 36 to be executed by the CPU 30. As the transportable storage medium 40, various types of storage medium such as CD-ROM, a flexible disk, an optical disk, an optical magneto disk, a DVD and the like can be used, and the program stored in such a storage medium is read by the read device 36 so that the extraction of the unmachined shape according to the present embodiment is realized.

As explained above, according to the present invention, the uncut shape can be extracted corresponding to the machining tool without generating machining track and the extracted shape is visualized as the three-dimensional shape so that it becomes easier for a designer of three-dimensional products to grasp the extracted shape and to recognize the shape which can be machined more easily at the stage of designing. Accordingly, the shape can be designed taking the machining efficiency into consideration.

Further, a partial machining track for efficiently cutting the uncut portion can be generated so that the machining can be more efficiently designed than in the case that the machining track is generated regarding all of the three-dimensional shapes of the product from the initial stage to the final stage. Also, the portion with a larger amount of the uncut portion can be grasped in advance so that the generation of the machining track such as machining with much load using a tool with a fine tip for example can be avoided. Accordingly, the system for designing safe and efficient machining processes is realized. Therefore, the system of the present invention greatly contributes to the enhancement of the machining efficiency of the three-dimensional machining system.

The present invention can be applied to all the industrial fields for manufacturing components and products by machining the material for example, and the industrial fields for providing programs for CAD/CAM devices.

What is claimed is:

1. A device for extracting an unmachined shape with respect to a product shape upon machining a product, comprising:
    a tool displacement unit for virtually displacing a machining tool corresponding to a selected point among predetermined points on a surface of a three-dimensional product shape model without causing interference between the product shape model and the machining tool by moving the machining tool in a direction vertical to the surface of the three-dimensional product shape model if interference between the product shape model and the machining tool occurs, thereby eliminating said interference;
    a distance detection unit for obtaining a distance between each of the predetermined points on the surface of the product shape model and corresponding projected points on the machining tool surface; and
    a three-dimensional shape preparation unit for preparing a three-dimensional unmachined shape by considering a shape of the machining tool surface using minimum values of the distances obtained regarding each of the predetermined points on the surface of the shape model and the corresponding points on the machining tool surface shape corresponding to a shape of the machine tool with the unmachined shape having cusps.

2. The device for extracting unmachined shape according to claim 1, further comprising:
    a three-dimensional shape visualization unit for visualizing the prepared three-dimensional unmachined shape.

3. A method for extracting an unmachined shape with respect to a product shape upon machining a product, comprising:
    virtually displacing a machining tool corresponding to a selected point among predetermined points on a surface of a three-dimensional product shape model without causing interference between the product shape model and the machining tool by moving the machining tool in a direction vertical to the surface of the three-dimensional product shape model if interference between the product shape model and the machining tool occurs, thereby eliminating said interference;
    obtaining a distance between each of the predetermined points on the surface of the product shape model and corresponding projected points on the machining tool surface; and
    preparing a three-dimensional unmachined shape by considering a shape of the machining tool surface using minimum values of the distances obtained regarding each of the predetermined points on the surface of the shape model and the corresponding points on the machining tool surface shape corresponding to a shape of the machine tool with the unmachined shape having cusps.

4. The method for extracting an unmachined shape according to claim 3, further comprising:
    visualizing the prepared three-dimensional unmachined shape.

5. A program executing in a computer extracting an unmachined shape with respect to a product shape upon machining a product, comprising
    a procedure of virtually displacing a machining tool corresponding to a selected point among predetermined points on a surface of a three-dimensional product shape model without causing interference between the product shape model and the machining tool by moving the machining tool in a direction vertical to the surface of the three-dimensional product shape model if interference between the product shape model and the machining tool occurs, thereby eliminating said interference;
    a procedure of obtaining a distance between each of the predetermined points on the surface of the product shape model and corresponding projected points on the machining tool surface; and
    a procedure of preparing a three-dimensional unmachined shape by considering a shape of the machining tool surface using minimum values of the distances obtained regarding each of the predetermined points on the surface of the shape model and the corresponding points on the machining tool surface shape corresponding to a shape of the machine tool with the unmachined shape having cusps.

6. A storage medium used by a computer extracting an unmachined shape with respect to a product shape upon machining a product, storing a program which causes the computer to execute:
    virtually displacing a machining tool corresponding to a selected point among predetermined points on a surface of a three-dimensional product shape model without causing interference between the product shape model and the machining tool by moving the machining tool in a direction vertical to the surface of the three-dimensional product shape model if interference between the product shape model and the machining tool occurs, thereby eliminating said interference;

obtaining a distance between each of the predetermined points on the surface of the product shape model and corresponding projected points on the machining tool surface; and preparing a three-dimensional unmachined shape by considering a shape of the machining tool surface using minimum values of the distances obtained regarding each of the predetermined points on the surface of the shape model and the corresponding points on the machining tool surface shape corresponding to a shape of the machine tool with the unmachined shape having cusps.

7. A method, comprising:

designating points of a virtual machined work piece shape;

projecting a machine tool to the points;

determining distances to a machined work piece shape surface from a tool surface at the points and moving the machine tool in a direction vertical to the surface of the machined work piece shape surface if interference between the machined work piece shape surface and the machine tool occurs, thereby eliminating said interference;

determining an unmachined work piece shape from the distances and corresponding points on the tool surface corresponding to a shape of the machine tool with the unmachined shape having cusps; and displaying the unmachined work piece shape.

8. A method, comprising:

projecting a machine tool to positions on a surface of a virtual machined work piece shape;

determining distances to a surface of the virtual machined work piece shape from a tool surface projected at the positions and moving the machine tool in a direction vertical to the surface of the virtual machined work piece shape if interference between the virtual machined work piece shape and the machine tool occurs, thereby eliminating said interference;

generating a work piece unmachined shape from the distances and corresponding positions on the tool surface corresponding to a shape of the machine tool with the unmachined shape having cusps.

9. A method, comprising:

projecting a machine tool to points of a virtual machined work piece shape;

determining an unmachined work piece shape having cusps from the distances obtained of a virtual machined work piece shape and corresponding points on the tool surface corresponding to a shape of the machine tool by moving the machine tool in a direction vertical to the virtual machined work piece shape if interference between the virtual machined work piece shape and the machine tool occurs, thereby eliminating said interference; and displaying the unmachined work piece shape.

* * * * *

UNITED STATES PATENT AND TRADEMARK OFFICE
CERTIFICATE OF CORRECTION

| | |
|---|---|
| PATENT NO. | : 7,319,913 B2 |
| APPLICATION NO. | : 11/146356 |
| DATED | : January 15, 2008 |
| INVENTOR(S) | : Satoshi Kanbayashi et al. |

Page 1 of 1

It is certified that error appears in the above-identified patent and that said Letters Patent is hereby corrected as shown below:

Column 8, Line 39, after "comprising" insert --:--.

Signed and Sealed this

Eighth Day of July, 2008

JON W. DUDAS
*Director of the United States Patent and Trademark Office*